(12) United States Patent
Kuo et al.

(10) Patent No.: US 8,643,334 B2
(45) Date of Patent: Feb. 4, 2014

(54) BATTERY BALANCING CIRCUIT AND BALANCING METHOD THEREOF AND BATTERY ACTIVATION METHOD

(75) Inventors: Kuo-Cheng Kuo, Tainan (TW); Sung-Hsin Hsiao, Taoyuan County (TW)

(73) Assignee: Simplo Technology Co., Ltd., Hsinchu County (TW)

( * ) Notice: Subject to any disclaimer, the term of this patent is extended or adjusted under 35 U.S.C. 154(b) by 317 days.

(21) Appl. No.: 13/236,957

(22) Filed: Sep. 20, 2011

(65) Prior Publication Data

US 2012/0262121 A1 Oct. 18, 2012

(30) Foreign Application Priority Data

Apr. 15, 2011 (TW) .............................. 100113290 A

(51) Int. Cl.
*H02J 7/00* (2006.01)
(52) U.S. Cl.
USPC ........... 320/126; 320/116; 320/117; 320/118; 320/119; 320/122
(58) Field of Classification Search
CPC .................................................... H02J 7/1423
USPC ........................................................ 320/126
See application file for complete search history.

(56) References Cited

U.S. PATENT DOCUMENTS

| | | | |
|---|---|---|---|
| 6,873,134 B2 * | 3/2005 | Canter et al. | 320/118 |
| 2008/0072859 A1 * | 3/2008 | Esaka et al. | 123/179.3 |

* cited by examiner

*Primary Examiner* — Edward Tso
*Assistant Examiner* — Ahmed Omar
(74) *Attorney, Agent, or Firm* — Rosenberg, Klein & Lee

(57) ABSTRACT

Disclosed is a battery balancing circuit for balancing the voltages of a reference battery module and a detachable battery apparatus, which has a load channel, a charging-discharging channel, a MCU and a charging-discharging control circuit. The reference battery module and detachable battery apparatus are connected in parallel. The load channel is connected to the reference battery module. The charging-discharging channel is disconnected from the reference battery module. The load and charging-discharging channels are connected to the detachable battery apparatus respectively through a first and a second switches. When the voltage of the detachable battery apparatus is higher or lower than a threshold value, the MCU controls the first and second switches, such that the detachable battery apparatus is connected to the charging-discharging control circuit through the charging-discharging channel and disconnected from the load channel. Then the MCU charges or discharges the detachable battery apparatus through the charging-discharging control circuit.

10 Claims, 3 Drawing Sheets

BATTERY BALANCING CIRCUIT AND BALANCING METHOD THEREOF AND BATTERY ACTIVATION METHOD

BACKGROUND OF THE INVENTION

1. Field of the Invention

The present invention relates to a battery balancing circuit, a balancing method and a battery module activation method.

2. Description of Related Art

For energy storage equipment such as an uninterruptible power supply of a server, there are several battery modules connected together in parallel for supplying power to an electric device, e.g. the said server.

However, when a newly added battery module connects to the existing battery module/modules in parallel, inrush current could be generated due to the voltage difference between the newly added and existing battery modules and then inputted into a load such as the aforementioned electric device and/or any of the battery modules. Such inrush current would damage the load and/or the battery module and thereby reduce the electric device's life and/or cause the battery module many problems.

Besides, once a battery module is kept fully-charged or unused for a long time, it could be affected by salinization, electrode plate corrosion and/or thermal runaway which lead to degradation or dead of the battery module.

SUMMARY OF THE INVENTION

An embodiment of the present invention provides a battery balancing circuit which balances the voltages of a detachable battery apparatus and a reference battery module, wherein the detachable battery apparatus is an detachable apparatus including a battery module or a detachable battery module which can be installed in or detached from the battery balancing circuit in a non-destructive way; the battery balancing circuit comprises a load channel, a charging-discharging channel, a micro control unit and an charging-discharging control circuit. The load channel is connected to the reference battery module and to the detachable battery apparatus via a first switch. The charging-discharging channel is disconnected from the reference battery module but connected to the detachable battery apparatus via a second switch. The micro control unit is connected to the reference battery module and the detachable battery apparatus. The charging-discharging control circuit is connected to the reference battery module via the load channel. When the voltage of the detachable battery apparatus is higher or lower than a threshold value, the micro control unit controls the first and second switches to ensure that the detachable battery apparatus is disconnected from the load channel but connected to the charging-discharging control circuit via the charging-discharging channel, and then the micro control unit make the reference battery module charge the detachable battery apparatus or the detachable battery apparatus discharge to the reference battery module through the charging-discharging control circuit.

An embodiment of the present invention provides a battery balancing method which balances the voltages of a detachable battery apparatus and a reference battery module connected with each other in parallel in a battery balancing circuit. The battery balancing circuit includes a load channel and a charging-discharging channel; the detachable battery apparatus is an detachable apparatus including a battery module or a detachable battery module, and can be installed in or detached from the battery balancing circuit through a non-destructive way. The reference battery module is connected to the load channel but disconnected from the charging-discharging channel. The detachable battery apparatus is connected to the load channel and the charging-discharging channel via a first and a second switches respectively. The method firstly obtains a threshold value according to the voltage of the reference battery module and then determines whether the voltage of the detachable battery apparatus is higher or lower than the threshold value. If the voltage of the detachable battery apparatus is higher or lower than the threshold value, the method controls the first and second switches to ensure that the detachable battery module is connected to the charging-discharging channel but disconnected from the load channel to thereby make the reference battery module charge the detachable battery apparatus or make the detachable battery apparatus discharge to the reference battery module. Once the voltage of the detachable battery apparatus reaches the threshold value, the method controls the first and second switches to ensure that the detachable battery module is connected to the load channel but disconnected from the charging-discharging channel.

An embodiment of the present invention provides a battery module activation method for activating a battery module to be activated in a battery system which stays idle or fully charged for a long time. The battery system comprises a reference battery module, the battery module to be activated, a load channel and a charging-discharging channel. The reference battery module is connected to the load channel while the battery module to be activated is connected to the load and charging-discharging channels via a first and a second switches respectively. The method firstly determines whether the capacity of the battery module to be activated remains higher than a preset value for a predetermined time; if so, the method controls the first and second switches to break the connection between the battery module to be activated and the load channel but build the connection between the battery module to be activated and the charging-discharging channel; and the method will discharge the electricity of the battery module to be activated to the reference battery module to thereby have the capacity of the battery module to be activated decrease to a predetermined ratio of the total capacity of the battery module to be activated. The method also obtains a threshold value through the voltage of the reference battery module to thereby uses the reference battery module to charge the battery module to be activated until its voltage reaches the threshold value; afterward, the method controls the first and second switches to disconnect the battery module to be activated from the charging-discharging channel but connect it to the load channel.

Briefly, the battery balancing circuit and the method thereof of the present invention can prevent an electric device circuit and/or a battery module connected to the battery balancing circuit from being damaged by inrush current to thereby extend their usage life. Similarly, the battery module activation method can increase the life of a battery module as well.

These and other objectives of the present invention will no doubt become obvious to those of ordinary skill in the art after reading the following detailed description of the preferred embodiment that is illustrated in the various figures and drawings.

DETAILED DESCRIPTION OF THE PREFERRED EMBODIMENTS

In an embodiment, the present invention provides a battery balancing circuit to balance the voltages between a plurality of battery modules connected in parallel. In another embodiment, the present invention provides a battery balancing method which can be executed by the above-mentioned battery balancing circuit. In a further embodiment, the present invention provides a battery module activation method which can be carried out by the above-mentioned battery balancing circuit.

[Embodiment of Battery Balancing Circuit]

Figure 1:
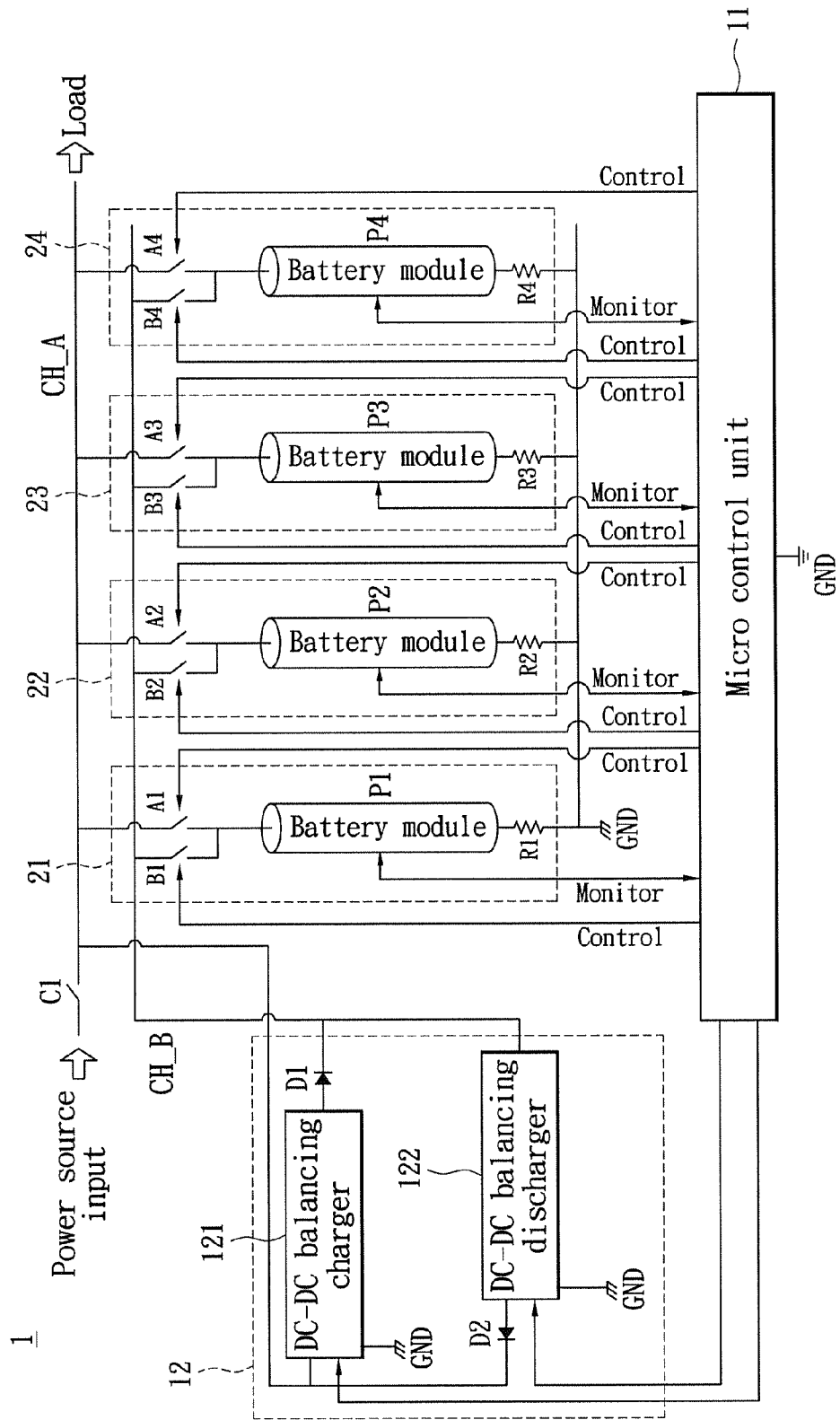
FIG. 1 is a circuit diagram according to an embodiment of the battery balancing circuit of the present invention.

Please refer to FIG. 1, which shows a circuit diagram according to an embodiment of the battery balancing circuit of the present invention. The battery balancing circuit 1 includes a micro control unit (MCU) 11, a charging-discharging control circuit 12, a load channel CH_A and a charging-discharging channel CH_B. In FIG. 1, the load channel CH_A is connected to a load and to a power source input via a power source switch C1. Both the charging-discharging channel CH_B and the load channel CH_A are connected to the charging-discharging control circuit 12.

A plurality of battery module apparatuses 21~24 are connected to each other in parallel, while their respective battery modules P1~P4 are connected to ground (GND) through the current detection resistors R1~R4, respectively. The battery modules P1~P4 are connected to the load channel CH_A via the load channel switches A1~A4 and to the charging-discharging channel CH_B via the charging-discharging channel switches B1~B4.

Please note that although the present embodiment takes four battery module apparatuses 21~24 for example, the number of battery module apparatuses is not a limitation to the invention. One of ordinary skill in the art will appreciate how to increase or decrease the number of battery module apparatuses to carry out the present invention by referring to the present specification. In this embodiment, at least one of the battery module apparatuses 21~24 and/or the battery modules P1~P4 is designed to be detachable, which means the detachable one can be installed in or detached from the battery balancing circuit 1 in a non-destructive way to thereby increase the implementation flexibility of the present invention. Moreover, one of the battery modules P1~P4 is used as a reference battery module to which the charging-discharging control circuit 12 is connected via the load channel CH_A.

The micro control unit 11 monitors the battery modules P1~P4 to access their information such as the capacities, currents, voltages and module types; furthermore, it also controls the on/off statuses of the load channel switches A1~A4 and the charging-discharging channel switches B1~B4. Besides, the micro control unit 11 can also control the on/off status of the power source switch C1. Accordingly, the micro control unit 11 can analyze the obtained information to thereby detect the new addition of a battery module or the removal of an existing battery module. Furthermore, the micro control unit 11 obtains a threshold value according to the information of the reference battery module and uses the threshold value as a level to decide whether it's appropriate to charge or discharge the other battery modules.

The aforementioned power source input could be a charger. When an electric apparatus is connected to the charger, the micro control unit 11 will switch on the power source switch C1 and the charging-discharging channel switches B1~B4, and concurrently switch off the load channel switches A1~A4. Besides, the micro control unit 11 controls the charging-discharging control circuit 12 to provide a charging path or a discharging path. As a result, the power source input not only provides power for the load connected to the load channel CH_A, but also provides power for the charging-discharging control circuit 12 to charge the battery modules P1~P4 via the charging-discharging control circuit 12 and the charging-discharging channel CH_B.

However, when the power source input (e.g. a charger) is not available or the user doesn't connect the electric apparatus to the power source input, the battery modules P1~P4 connected in parallel supply the power for the load instead. However, if the voltages of the battery modules P1~P4 are different because, for example, one of the battery modules P2~P4 is newly added while the battery module P1 is set as the reference battery module, inrush current could be generated and inputted into the electric apparatus and/or any of the battery modules. To prevent the inrush current, the micro control unit 11 will determine whether the voltages of the battery modules P2~P4 are the same as that of the battery module P1. Please note that when the micro control unit 11 is doing examination, the battery module P1, i.e. the reference battery module, is connected to the load channel CH_A through switching on the load channel switch A1 but disconnected from the charging-discharging channel CH_B through switching off the charging-discharging channel switch B1.

If the voltage of the battery module P2 is different from that of the battery module P1 (that is to say, the voltage of the battery module P2 higher or lower than a threshold value derived from the voltage of the battery module P1), the load channel switch A2 is off and the charging-discharging channel switch B2 is on to thereby allow the battery module P1 to charge or receive the power from the battery module P2 via the charging-discharging control circuit 12, so as to equalize the voltages of the two parallel-connected battery modules P1, P2. Once the two voltages are the same or near enough, the charging-discharging channel switch B2 is switched off while the load channel switch is switched on.

More specifically, when using the battery module P1 as the reference battery module, it will be connected to the load channel CH_A (that is to say, the load channel switch A2 being on) but disconnected from the charging-discharging channel CH_B (i.e. the charging-discharging channel switch B2 being off); meanwhile, if the voltage of the battery module P2 is higher than that of the battery module P1, the micro control unit 11 has the battery module P2 discharge power to the battery module P1 via the charging-discharging control circuit 12, wherein the battery module P2 is connected to the charging-discharging channel CH_B (i.e. the charging-discharging channel switch B2 being on) but disconnected from the load channel CH_A (i.e. the load channel switch A2 being off).

On the other hand, if the voltage of the battery module P2 is lower than that of the battery module P1, the micro control unit 11 has the battery module P1 charge the battery module P2 via the charging-discharging control circuit 12; similarly, the battery module P2 is connected to the charging-discharging channel CH_B (i.e. the charging-discharging channel switch B2 being on) but disconnected from the load channel CH_A (i.e. the load channel switch A2 being off).

The micro control unit 11 checks whether the voltage of the battery module P2 is equal or close to the voltage of the battery module P1 every a period of time (e.g. 1 second, which is exemplary and not a limitation to the present invention), wherein a difference within, for instance, 0.5 volt could be deemed close. If the voltages are equal or close, the battery module P2 will be connected to the load channel CH_A by switching on the load channel switch A2 but disconnected from the charging-discharging channel CH_B by switching off the charging-discharging channel switch B2 to thereby prepare for supplying power to the load.

Please note that it could be the battery module P3 or P4 instead of the battery module P2 that has a voltage different from the other battery modules. Under such conditions, a person of ordinary skill in the art will appreciate how to carry out the present invention to make sure that all the voltages of the battery modules P1~P4 connected in parallel are substantially the same or close enough by referring to the aforementioned description. Additionally, when a battery module is added, the micro control unit 11 may check whether the type or model of the added battery module is on its list; if the check result is positive, the micro control unit 11 will further check whether the voltage of the added battery module is the same as or close to that of the reference battery module (e.g. the battery module P1).

If the added battery module has a voltage different from that of the reference battery module, the aforementioned charging or discharging process is thereby executed before connecting the added battery module to the load channel CH_A. Besides, if the type or model of the added battery module can't be recognized, which means that the type or model is not on the preset list of the micro control unit 11, then the micro control unit 11 will disconnect the added battery module from the load channel CH_A and charging-discharging channel CH_B.

Please note that the aforementioned threshold value could be the voltage of the reference battery module; however, this is not a limitation to the present invention. The threshold value could be realized by a range. In another embodiment, the voltage of the reference battery module adding and subtracting an offset value (e.g. 0.5 volt) respectively defines a threshold range with an upper limit (i.e. the offset value plus the reference voltage) and a lower limit (i.e. the offset value minus the reference voltage). Accordingly, the voltage of the added battery module higher than the upper limit means that it's higher than the threshold value; the voltage of the added battery module lower than the lower limit means that it's lower than the threshold value; and the voltage of the added battery module falling within the threshold range between the upper and lower limits means that it's equal or close to the threshold value.

An embodiment of the charging-discharging control circuit 12 is illustrated in the following and shown in FIG. 1. The charging-discharging control circuit 12 includes a DC-DC (direct-current to direct current) balancing charger 121, a DC-DC balancing discharger 122, and two diodes D1 and D2. The input of the DC-DC balancing charger 121 is connected to the load channel CH_A while its output is connected to the input of the diode D1; moreover, its control end is coupled to the micro control unit 11. The input of the DC-DC balancing discharger 122 is connected to the charging-discharging channel CH_B while its output is connected to the input of the diode D2; furthermore, its control end is coupled to the micro control unit 11. Besides, the output ends of the diodes D1, D2 are connected to the charging-discharging channel CH_B and load channel CH_A respectively.

When the added battery module (e.g. the battery module P2) possesses a voltage lower than the voltage of the reference battery module (e.g. the battery module P1), the DC-DC balancing charger 121 is enabled by receiving a charging control signal from the micro control unit 11; meanwhile, the load channel switch A1 and the charging-discharging channel switch B2 are switched on, but the load channel switch A2 and the charging-discharging channel switch B1 are switched off. Afterward, the DC-DC balancing charger 121 starts charging the added battery module (e.g. the battery module P2) via the charging-discharging channel CH_B by providing a constant or changeable charging current and voltage originated from the reference battery module (e.g. the battery module P1); the micro control unit 11 will monitor the voltage of the added and/or reference battery module to determine whether the balance is reached. If the balance is reached, the micro control unit 11 produces a control signal to stop the charging operation of the DC-DC balancing charger 121. The diode D1 is used for preventing the added battery module (e.g. the battery module P2) from outputting current into the DC-DC balancing charger 121 and causing its malfunction. In other words, the diode D1 provides protection function.

When the added battery module (e.g. the battery module P2) possesses a voltage higher than the voltage of the reference battery module (e.g. battery module P1), the DC-DC balancing discharger 122 is enabled by receiving a discharging control signal from the micro control unit 11; meanwhile, the load channel switch A1 and the charging-discharging channel switch B2 are switched on, but the load channel switch A2 and the charging-discharging channel switch B1 are switched off. Afterward, the DC-DC balancing discharger 122 starts discharging power from the added battery module (e.g. the battery module P2) to the reference battery module (e.g. battery module P1) via the charging-discharging channel CH_B through providing a constant or changeable charging current and voltage; the micro control unit 11 will monitor the voltage of the added and/or reference battery module (e.g. the battery module P1) to determine whether the balance is reached. If the balance is reached, the micro control unit 11 produces a control signal to stop the discharging operation of the DC-DC balancing discharger 122. The diode D2 is used for preventing the reference battery module (e.g. the battery module P1) from outputting current into the DC-DC balancing discharger 122 and causing its malfunction. In other words, the diode D2 provides protection function.

Once the voltage of the added battery module (e.g. the battery module P2) reaches the voltage of the reference battery module (e.g. the battery module P1), the DC-DC balancing charger 121 and the DC-DC balancing discharging 122 will be disabled by the micro control unit 11; meanwhile, the load channel switches A1 and A2 are switched on, but the charging-discharging channel switches B1 and B2 are switched off.

In sum, the aforementioned battery balancing circuit 1 checks the voltage difference between an added or existing battery module and the reference battery module which are connected to each other in parallel through using the micro control unit 11, and then balances the voltages of the concerned battery modules by using the charging-discharging control circuit 12 to thereby prevent inrush current from being generated and inputted into the electric apparatus and/or any of the connected battery modules.

[Embodiment of Battery Balancing Method]

Figure 2:
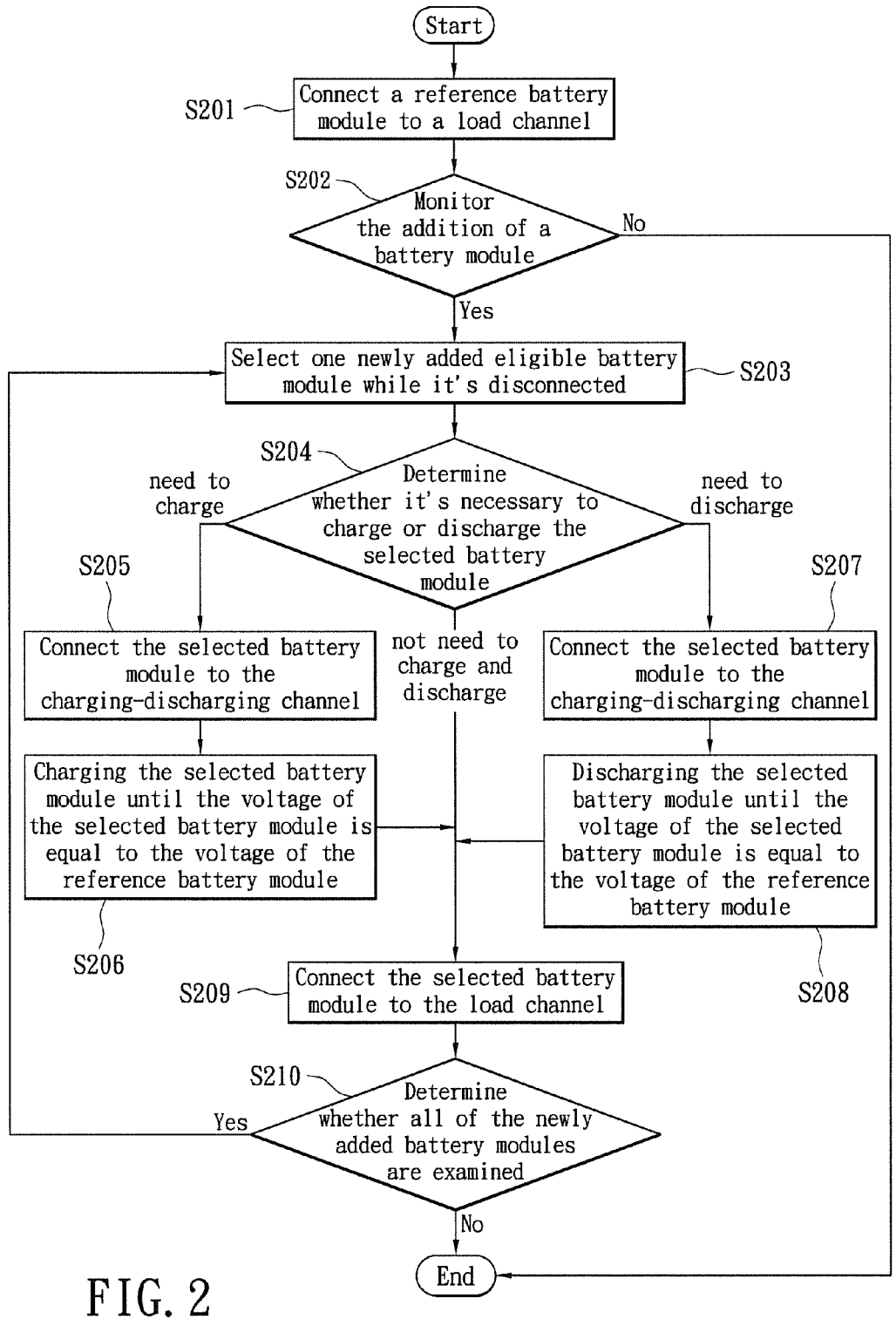
FIG. 2 is a flow chart according to an embodiment of the battery balancing method of the present invention.

Please refer to FIG. 2 which shows the flow chart according to an embodiment of the battery balancing method of the present invention. The method can be carried out through using the battery balancing circuit of FIG. 1, but this is not a limit to the present invention. Any circuitry, device or apparatus capable of realizing the present method is an option.

An embodiment of the method comprises the following steps. First, step S201 uses a micro control unit to control switches to thereby connect a reference battery module to a load channel and disconnect the reference battery module from a charging-discharging channel. Afterward, if a user adds a detachable battery module, which could be a detachable apparatus including a battery module instead, to the existing battery modules including the reference battery module and has them be connected in parallel, in order to prevent inrush current caused by the voltage difference between the newly added battery module and any of the other battery modules from damaging the load (e.g. an electric apparatus) or any of the connected battery modules, the voltage of the newly added battery module should be compared to the voltage of the reference battery module to thereby charge or discharge the newly added battery module if its voltage is not equal or close to the voltage of the reference battery module. After charging or discharging the newly added battery module, the newly added battery module can be connected to the load channel to provide power.

Step S202 uses the micro control unit to monitor the addition of a battery module. If there is no such addition or the type or model of the newly added battery module is not on a preset list of the micro control unit, the method finishes; if the addition of an eligible battery module is detected, step 203 is then executed. Step S203 uses the micro control unit to select one newly added eligible battery module while it's disconnected from the load channel and charging-discharging channel.

Step S204 uses the micro control unit to determine whether it's necessary to charge or discharge the selected battery module. If the micro control unit determines that the voltage of the selected battery module is higher than the voltage of the reference battery module by a predetermined voltage difference such as 0.5 volt, then it determines that the selected battery module needs to be discharged through executing step 207; if the micro control unit determines that the voltage of the selected battery module is lower than the voltage of the reference battery module by a predetermined voltage difference such as 0.5 volt, then it determines that the selected battery module needs to be charged through executing step 205; if the micro control unit determines that the voltage difference between the selected battery module and the reference battery module is zero or within a predetermined range, then it determines that the selected battery module needs not to be charged or discharged, and step 209 is executed.

If the selected battery module needs to be charged, step S205 will use the micro control unit to control a plurality of switches to connect the selected battery module to the charging-discharging channel and disconnect it from the load channel. Afterward, step S206 uses the micro control unit to control the charging-discharging control circuit to receive the voltage information of the reference battery module and accordingly generate a constant or changeable voltage and/or current for charging the selected battery module. The micro control unit will periodically monitor the voltages of the reference battery module and the selected battery module and stop the charging operation once their voltages are the same or close enough (e.g. the voltage difference less than 0.5 volt); afterward, step S209 is executed.

If the selected battery module needs to be discharged, step S207 will use the micro control unit to control a plurality of switches to connect the selected battery module to the charging-discharging channel and disconnect it from the load channel. Afterward, step S208 uses the micro control unit to control the charging-discharging control circuit to receive the voltage information of the selected battery module to accordingly generate a constant or changeable voltage and/or current signal for discharging from the selected battery module to the reference battery module. The micro control unit will periodically monitor the voltages of the reference battery module and the selected battery module and stop the discharging operation once their voltages are the same or close enough (e.g. the voltage difference less than 0.5 volt); afterward, step S209 is executed.

When the voltage of the selected battery module is equal or close to the voltage of the reference battery module, step S209 will use the micro control unit to connect the selected battery module to the load channel through a plurality of switches and disconnect it from the charging-discharging channel. Since the voltages of the selected and reference battery modules are the same or similar, the generation of inrush current is thereby avoided.

Consequently, the step S210 uses the micro control unit to determine whether all of the newly added battery modules are examined; if there is any other newly added battery module untreated, step S203 is then executed again; if there is no other newly added battery module untreated, the method finishes. Through the present method, the inrush current caused by the voltage difference between the parallel-connected battery modules is eliminated or mitigated.

[Embodiment of Battery Module Activation Method]

The battery balancing circuit of FIG. 1 is not only capable of balancing the voltages of battery modules, but also capable of activating an idle battery module staying fully charged or unused for a predetermined time, which thereby prevents the idle battery module from suffering the problem such as salinization, electrode plate corrosion and/or thermal runaway, and consequently increases its usage life.

Figure 3:
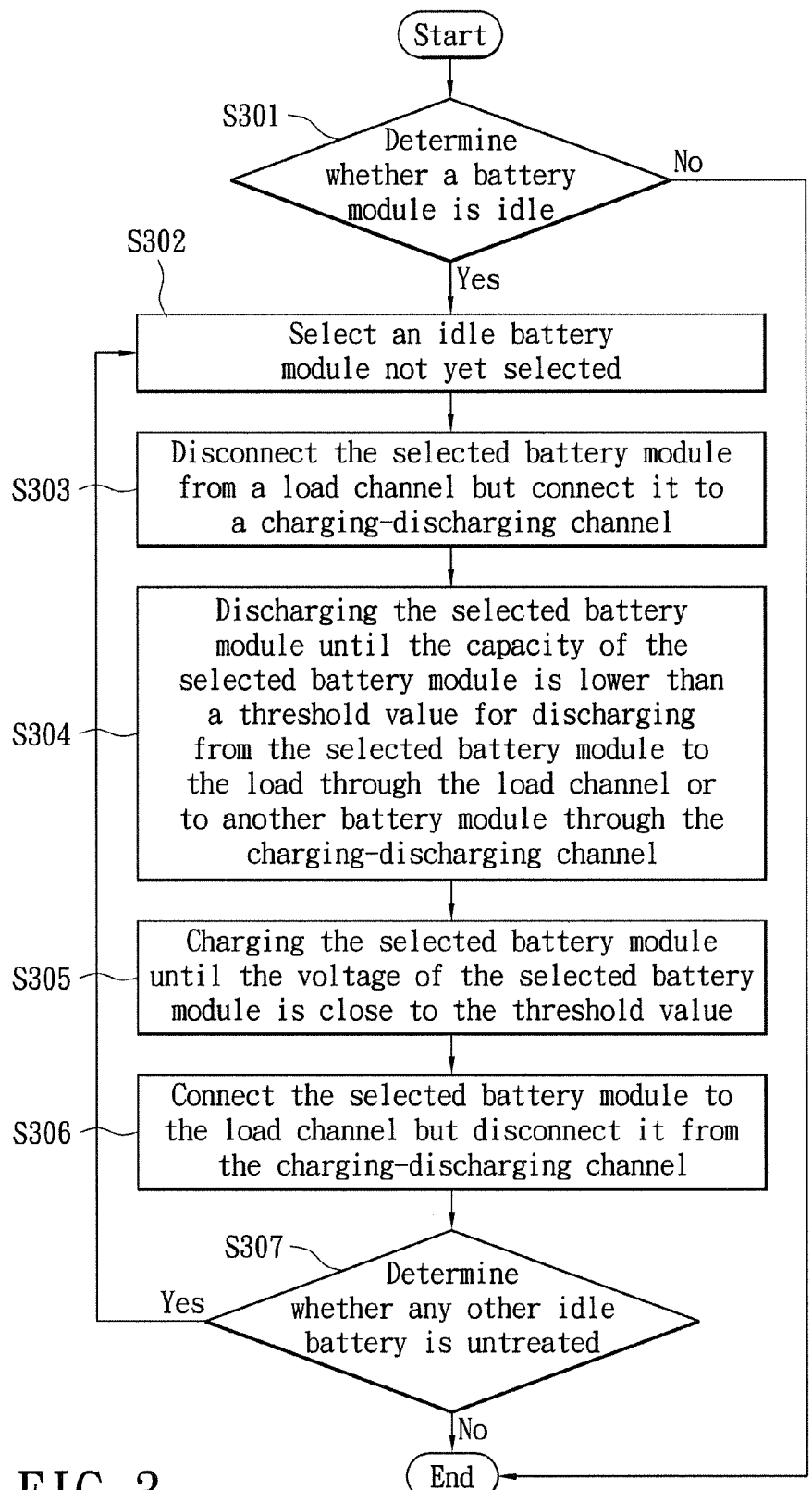
FIG. 3 is a flow chart according to an embodiment of the battery module activation method of the present invention.

Please refer to FIG. 3 which illustrates the flow chart according to an embodiment of the battery module activation method of the present invention. First, step S301 uses a micro control unit to determine whether a battery module is idle. More specifically, step S301 uses the micro control unit to determine whether the capacity of the battery module stays above a predetermined level for a predetermined time to see whether it's idle. If the battery module is idle, i.e. its capacity staying above the predetermined level for the predetermined time, step S302 is then executed; if it's not idle, the battery module activation method finishes. Step S302 uses the micro control unit to select an idle battery module not yet selected and then step S303 uses the micro control unit to disconnect the selected battery module from a load channel but connect it to a charging-discharging channel through controlling the corresponding switches.

Then step S304 uses the micro control unit to control a charging-discharging control circuit, which receives the voltage information of the selected battery module and accordingly generates a constant or changeable voltage and/or current, for discharging from the selected battery module to the load through the load channel or to another battery module through the charging-discharging channel. This discharging step will continue until the capacity of the selected battery module is lower than a threshold value (e.g. 20%~50% of a reference capacity such as the designed or fully-charged capacity of the selected battery module).

After discharging the selected battery module, step S305 uses the micro control unit to control the charging-discharging control circuit, which obtains another threshold value according to the voltage of the reference battery module and generates a constant or changeable voltage and/or current signal, for charging the selected module. The charging step goes on until the voltage of the selected battery module is equal or close to the threshold value. Afterward, step S306 uses the micro control unit to connect the selected battery module to the load channel but disconnect it from the charging-discharging channel through controlling the corresponding switches.

Finally, step S307 uses the micro control unit to determine whether any other idle battery is untreated; if so, the step S301 is then executed again; if not, the battery module activation method is over.

[Effects of the Aforementioned Embodiments]

To sum up the aforementioned description, the embodiments of the present invention provides a battery balancing circuit and method to prevent inrush current from inputting into a load (e.g. an electric apparatus) and/or any of the connected battery modules, so as to protect the load and/or the concerned battery module. Besides, the embodiments further provide a battery module activation circuit and method to activate an idle battery module to thereby extend its usage life.

Finally, please note that the aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. A battery balancing circuit for balancing the voltages of a detachable battery apparatus and a reference battery module, wherein the detachable battery apparatus and the reference battery module are connected in parallel, and the detachable battery apparatus, which can be added to and detached from the battery balancing circuit in a non-destructive way, is a detachable apparatus including a battery module or a detachable battery module, the battery balancing circuit comprising:
    a load channel connected to the reference battery module and connected to the detachable battery apparatus through a first switch;
    a charging-discharging channel disconnected from the reference battery module but connected to the detachable battery apparatus through a second switch;
    a micro control unit, connected to the reference and detachable battery module, for accessing information of the reference battery module and the detachable battery apparatus and obtaining a threshold value according to the voltage of the reference battery module; and
    an charging-discharging control circuit connected to the reference battery module thorough the load channel,
    wherein when the voltage of the detachable battery apparatus is higher or lower than the threshold value, the micro control unit controls the first and second switches to ensure that the detachable battery apparatus is disconnected from the load channel but connected to the charging-discharging control circuit through the charging-discharging channel, and the micro control unit further makes the reference battery module charge the detachable battery apparatus or makes the detachable battery discharge to the reference battery module.

2. The battery balancing circuit of claim 1, wherein when the voltage of the detachable battery apparatus is higher than the threshold value, the micro control unit makes the detachable battery apparatus discharge to the reference battery module by utilizing the charging-discharging control circuit; and when the voltage of the detachable battery apparatus is lower than the threshold value, the micro control unit makes the reference battery module charge the detachable battery apparatus by utilizing the charging-discharging control circuit.

3. The battery balancing circuit of claim 1, wherein the voltage of the detachable battery apparatus is equal to the threshold value or the voltage difference between the detachable battery apparatus and the reference battery module is within a predetermined range, the micro control unit controls the first and second switches to ensure that the detachable battery apparatus is disconnected from the charging-discharging channel but connected to the load channel.

4. The battery balancing circuit of claim 1, wherein the micro control unit is used to determine whether there adds a new detachable battery apparatus to be connected with the reference battery module.

5. The battery balancing circuit of claim 1, wherein the charging-discharging control circuit comprises:
    a first diode having an output end connected to the charging-discharging channel;
    a second diode having an output end connected to the load channel;
    a DC-DC balancing charger, which is under the control of the micro control unit, having an input end connected to the detachable battery apparatus through the load channel and an output end connected to an input end of the first diode; and
    a DC-DC balancing discharger, which is under the control of the micro control unit, having an input end connected to the reference battery module through the charging-discharging channel and an output end connected to an input end of the second diode.

6. The battery balancing circuit of claim 5, wherein the DC-DC balancing charger is enabled by a charging control signal from the micro control unit to thereby charge the detachable battery apparatus through using the reference battery module.

7. The battery balancing circuit of claim 5, wherein the DC-DC balancing discharger is enabled by a discharging control signal from the micro control unit to thereby make the detachable battery apparatus discharge to the reference battery module.

8. A battery balancing method for balancing the voltages of a detachable battery apparatus and a reference battery module, wherein the detachable battery apparatus and the reference battery module are connected in parallel, and the detachable battery apparatus, which can be added to and detached from the battery balancing circuit in a non-destructive way, is a detachable apparatus including a battery module or a detachable battery module, the battery balancing method comprising:
    using a micro control unit to obtain a threshold value according to the voltage of the reference battery module;
    using the micro control unit to determine the relation between the voltage of the detachable battery apparatus and the threshold value;
    if the relation indicates that the voltage of the detachable battery apparatus is higher than the threshold value, using the micro control unit to have the reference battery module charge the detachable battery apparatus;
    if the relation indicates that the voltage of the detachable battery apparatus is lower than the threshold value, using the micro control unit to have the detachable battery apparatus discharge to the reference battery module;
    if the relation indicates that the voltage of the detachable battery apparatus is equal to the threshold value or the voltage difference between the detachable battery apparatus and the reference battery module is within a predetermined range, using the micro control unit to have the detachable battery apparatus be connected to a load to provide power.

9. The battery balancing method of claim 8, wherein the predetermined range is obtained by adding an offset value to and subtracting the offset value from the voltage of the reference battery module respectively.

10. A battery module activation method for activating an idle battery module in a battery system which comprises a reference battery module, the idle battery module, a load channel and a charging-discharging channel, wherein the reference battery module is connected to the load channel and the idle battery module is connected to the charging-discharging channel through a first switch and a second switch, the battery module activation method comprising:
   determining whether the capacity of the idle battery module stays above a predetermined level for a predetermined time;
   if the capacity of the idle battery module stays above the predetermined level for the predetermined time, controlling the first and second switches to ensure that the idle battery module is disconnected from the load channel but connected to the charging-discharging channel;
   discharging from the idle battery module to the reference battery module through the charging-discharging channel to reduce the capacity of the idle battery module to a predetermined ratio of a reference capacity of the idle battery module;
   obtaining a threshold value according to the voltage of the reference battery module;
   using the reference battery module to charge the idle battery module through the charging-discharging channel until the voltage of the idle battery module reaches the threshold value; and
   after the voltage of the idle battery module reaching the threshold, controlling the first and second switches to thereby disconnect the idle battery module from the charging-discharging channel but connect the idle battery module to the load channel.

* * * * *